(12) United States Patent
Naude

(10) Patent No.: US 8,800,398 B2
(45) Date of Patent: Aug. 12, 2014

(54) CONTINUOUSLY VARIABLE TRANSMISSION MACHINE

(75) Inventor: Johannes Jacobus Naude, Randburg (ZA)

(73) Assignee: Varibox IP (Pty) Ltd, Randburg (ZA)

( * ) Notice: Subject to any disclaimer, the term of this patent is extended or adjusted under 35 U.S.C. 154(b) by 888 days.

(21) Appl. No.: 12/741,243

(22) PCT Filed: Jan. 19, 2009

(86) PCT No.: PCT/ZA2009/000005
§ 371 (c)(1),
(2), (4) Date: May 4, 2010

(87) PCT Pub. No.: WO2009/092120
PCT Pub. Date: Jul. 23, 2009

(65) Prior Publication Data
US 2010/0229680 A1  Sep. 16, 2010

(30) Foreign Application Priority Data

| Jan. 18, 2008 | (ZA) | 2008/00528 |
| Mar. 4, 2008 | (ZA) | 2008/02056 |
| Mar. 19, 2008 | (ZA) | 2008/02567 |
| Nov. 7, 2008 | (ZA) | 2008/09551 |

(51) Int. Cl.
*F16H 29/04* (2006.01)

(52) U.S. Cl.
CPC ..................................... *F16H 29/04* (2013.01)
USPC ............................................. 74/117; 74/124

(58) Field of Classification Search
CPC ...................................................... F16H 29/04
USPC ........... 74/112, 116, 117, 122, 123, 124, 125, 74/125.5
See application file for complete search history.

(56) References Cited

U.S. PATENT DOCUMENTS

| 2,399,177 | A | * | 4/1946 | Frangquist | 74/124 |
| 2,554,463 | A | * | 5/1951 | Klamp | 74/124 |
| 2,716,348 | A | * | 8/1955 | Brandt | 74/124 |
| 3,427,888 | A | * | 2/1969 | Rheinlander | 74/55 |
| 4,487,085 | A | * | 12/1984 | Collins | 74/113 |
| 4,936,155 | A | * | 6/1990 | Gogins | 74/117 |
| 5,390,558 | A | | 2/1995 | Weinberg | |
| 7,416,506 | B2 | * | 8/2008 | Naude | 475/218 |
| 8,425,364 | B2 | * | 4/2013 | Lahr | 475/207 |
| 2004/0083836 | A1 | * | 5/2004 | Park | 74/117 |
| 2006/0154774 | A1 | * | 7/2006 | Naude | 475/16 |
| 2007/0238568 | A1 | * | 10/2007 | Lahr | 475/207 |

FOREIGN PATENT DOCUMENTS

| EP | 1 592 900 | 11/2005 |
| GB | 484 692 | 5/1938 |
| JP | 1-193435 | 8/1989 |
| WO | 82/02233 | 7/1982 |

OTHER PUBLICATIONS

International Search Report dated May 8, 2009, from corresponding PCT application.

\* cited by examiner

*Primary Examiner* — Troy Chambers
*Assistant Examiner* — Gregory Prather
(74) *Attorney, Agent, or Firm* — Young & Thompson

(57) ABSTRACT

A ratcheting-type, rotor controlled, continuously variable transmission machine wherein the circumferential length of a cross-sectional profile of a body of the rotor is substantially constant, and the maximum positive swivel angle of the body is substantially equal in magnitude to the maximum negative swivel angle of the body.

11 Claims, 12 Drawing Sheets

CONTINUOUSLY VARIABLE TRANSMISSION MACHINE

BACKGROUND OF THE INVENTION

This invention relates to a rotor-driven, continuously variable transmission (CVT) machine of the general type described in the specification of European patent No. EP 1592900.

Prior art relevant to CVT machines in general is briefly discussed in the specification of the aforementioned patent.

One category of CVT machines, in widespread use, works on a friction drive principle operating in a traction fluid. A conceptually different type of CVT machine makes use of a cam or rotor-based ratcheting technique. The latter category of machine, which inherently has a higher mechanical efficiency advantage over the friction drive type machine, does however have limitations, of which the applicant is aware, which include one or more of the following:
a) a rippled output i.e. the output rotational speed is not directly and continuously related to the input rotational speed;
b) high stresses which are generated by point contact between a cam and cam followers. This limits the capability to transmit forces;
c) the rotor must be relatively long to achieve a large variation between input and output speeds. This mitigates against use in applications in which small volumes are required;
d) the rotor has a small radius of curvature over a portion of its length. This restricts the size of rotor followers which act on the rotor and this, in turn, reduces the force-transmitting capabilities of the rotor followers;
e) static and dynamic balancing of a rotor, which has a variable cross-section, can be problematic;
f) it can be difficult to obtain adequate spring load, from a biasing element, to keep the cam followers in contact with the cam at a high input rotational speed; and
g) the swivel angles of the rotor followers (i.e. the angular deviations of the rotor followers, from the rotor's longitudinal axis, for a fixed position of the rotor followers relative to the longitudinal axis) tend to be large. This can cause large resultant forces on the rotor followers in the axial direction of the rotor.

Other problems encountered include backlash which can arise in a linkage between a rotor follower and an output shaft—this can cause shock loads, and wear and freewheel drag torque on a one-way clutch which transfers rotational movement from a rocker arm arrangement to an output shaft.

It is an object of the present invention to provide a rotor-based, ratcheting, continuously variable transmission machine which addresses, at least partly, the aforementioned problems.

SUMMARY OF INVENTION

The invention provides a continuously variable transmission machine which includes:
a) a rippled output i.e. the output rotational speed is not directly and continuously related to the input rotational speed;
b) a rotor which is rotatable about a longitudinal axis which extends in a first direction and which has a variable stroke body with a low lift section, a high lift section and a surface which extends continuously in a circumferential sense about the longitudinal axis between the low lift section and the high lift section;
c) an output shaft;
d) a plurality of rotor followers, engaged with the rotor, which are linearly movable in the first direction relative to the rotor, each rotor follower including a respective rotor follower axis and a thrust point which is linearly movable relative to the longitudinal axis of the rotor upon rotation of the rotor; and
e) an output drive mechanism, responsive to movement of the rotor followers, for causing rotation of the output shaft at a speed which is dependent, at least, on the rotational speed of the rotor and on the linear position of the rotor followers relative to the rotor, and wherein:
each rotor follower, for a given linear position relative to the rotor, is movable between a first limiting angular position at which the rotor follower axis subtends a first maximum angle to the longitudinal axis of the rotor and a second limiting angular position at which the rotor follower axis subtends a second maximum angle to the longitudinal axis of the rotor and wherein the first maximum angle is approximately equal in magnitude to the second maximum angle.

If these angles are approximately equal in magnitude, the resultant forces on the rotor followers, acting in the longitudinal direction of the rotor, are restricted and preferably are minimized. By contrast, if one angle is significantly larger than the other, for example more than 20% larger, the resultant forces (which vary as the sine value of each angle) vary disproportionately and constitute a negative factor. This significantly impedes effective design for the requirements for support structure for the rotor followers then become dependent on the angular positions of the rotor followers about the rotor's longitudinal axis.

"Approximately equal", in this respect, thus means that one maximum angle does not differ from the other maximum angle by more than about 20%.

Other benefits of this feature are the compact rotor structure which is obtained, and an increase in magnitude of the minimum radius of curvature of the rotor surface taken at any plane which is at a right angle to the rotor's axis.

Preferably the length of a circumferential profile of the rotor surface, on any plane between the low lift section and the high lift section, which is at a right angle to the longitudinal axis, is substantially constant. This feature also helps to reduce the size of the rotor and to increase the size of the minimum radius of curvature of the rotor surface.

The thrust point is the point through which a resultant force, exerted by the rotor on the rotor follower, is transmitted in a linear direction away from the longitudinal axis of the rotor.

Each rotor follower may include at least one cylindrical roller, rotatable about the rotor follower axis, which bears against the rotor surface and which remains in line-contact, as opposed to point contact, with the rotor surface as the rotor follower is moved linearly in the first direction relative to the rotor. The in line-contact feature, together with the increased minimum radius of curvature of the rotor surface (as referred to), enable the force which is transmitted from the rotor to the rotor follower to be increased.

A biasing mechanism may be included which continuously biases each cylindrical roller into line-contact with the rotor surface. The biasing mechanism may include one or a plurality of springs, torsion bars or similar devices, or any combination thereof.

The rotor surface, at or near the low lift section, may have a circumferential profile, centred on the longitudinal axis, which is circular and which is referred to herein as a geared neutral point. When the cylindrical rollers of the rotor followers are brought to bear against the rotor surface and the respective thrust points of the rotor followers are in register with the circular circumferential profile, the thrust points are not movable in the direction of the longitudinal axis of the rotor. The CVT then has a zero output speed, irrespective of the rotational speed of the rotor. This is equivalent to the result achieved by using a neutral gear, for example in an automotive application. However this feature is achieved without using a clutch, and represents a significant cost and technical advantage.

The rotor body may be formed with at least one passage which extends between the low lift section and the high lift section and which has a cross-section which is varied to optimize static and dynamic balancing of the rotor body.

The output drive mechanism may take on any suitable form. In one example of the invention the output drive mechanism includes at least first and second output drive devices and each output drive device respectively includes a rocker arm, a connection arrangement which linearly converts linear movement (in the first direction) of the thrust point of a respective rotor follower into oscillatory rotational movement of the rocker arm about a rocker arm axis, an output gear, and a one-way clutch which acts between the rocker arm and the output gear thereby to cause rotation of the output gear in one direction. The relationship between the number of output drive devices (N) and the degree of angular movement (A) for which the linear conversion takes place is thus determined by the relationship $360° = N.A$.

At least one output gear may include a drive gear, a backlash gear superimposed on the drive gear, and a backlash biasing arrangement which biases the backlash gear in a rotational direction, relative to the drive gear, thereby at least to reduce backlash between the output gears of the output drive devices.

The connection arrangement may be selected from the following configurations:
a) a configuration in which at least one roller is mounted to the rocker arm and the rotor follower has a partly circular thrust surface, centred on the thrust point, which bears against the roller; and
b) a configuration in which a rack member with an angled flat rack surface is movable by the rotor follower and the rocker arm has an involute thrust surface which bears on the flat rack surface of the rack member.

The rack member may be on a carriage which is constrained to reciprocate linearly. A degree of transverse movement of the rack member relative to the direction of linear movement of the thrust point of the rotor follower, may be allowed.

In one form of the invention a bearing arrangement is positioned between the rack member and the rotor follower. The bearing arrangement allows for limited rotational movement of the rotor follower relative to the rack member in at least two transverse directions. The bearing arrangement conveniently includes a plurality of ball bearings which are constrained by a suitable mounting structure to move in sets of grooves formed in opposing surfaces of a carriage which carries the rack member and of structure which supports the rollers of the rotor follower.

The one-way clutch may include an inner race, centred on the rocker arm axis, which has a circumferential outer surface which is fixed to the rocker arm, an outer race which has a profiled ramp surface which opposes and which is spaced from the circumferential outer surface, a plurality of ramp rollers which are movably located between the profiled ramp surface and the circumferential outer surface, and biasing components which secure the ramp rollers to the outer race.

BRIEF DESCRIPTION OF THE DRAWINGS

The invention is further described by way of examples with reference to the accompanying drawings in which:

FIG. 9(a) shows the arrangement of FIG. 9 from an opposing side;

FIG. 10(a) shows the one-way clutch from an opposing side;

FIGS. 15 and 15(a) show an alternative arrangement for converting linear rotor follower movement into rotary rocker arm movement;

FIGS. 16 and 16(a) show details of another CVT machine according to the invention.

DESCRIPTION OF PREFERRED EMBODIMENTS

Figures 1, 2:
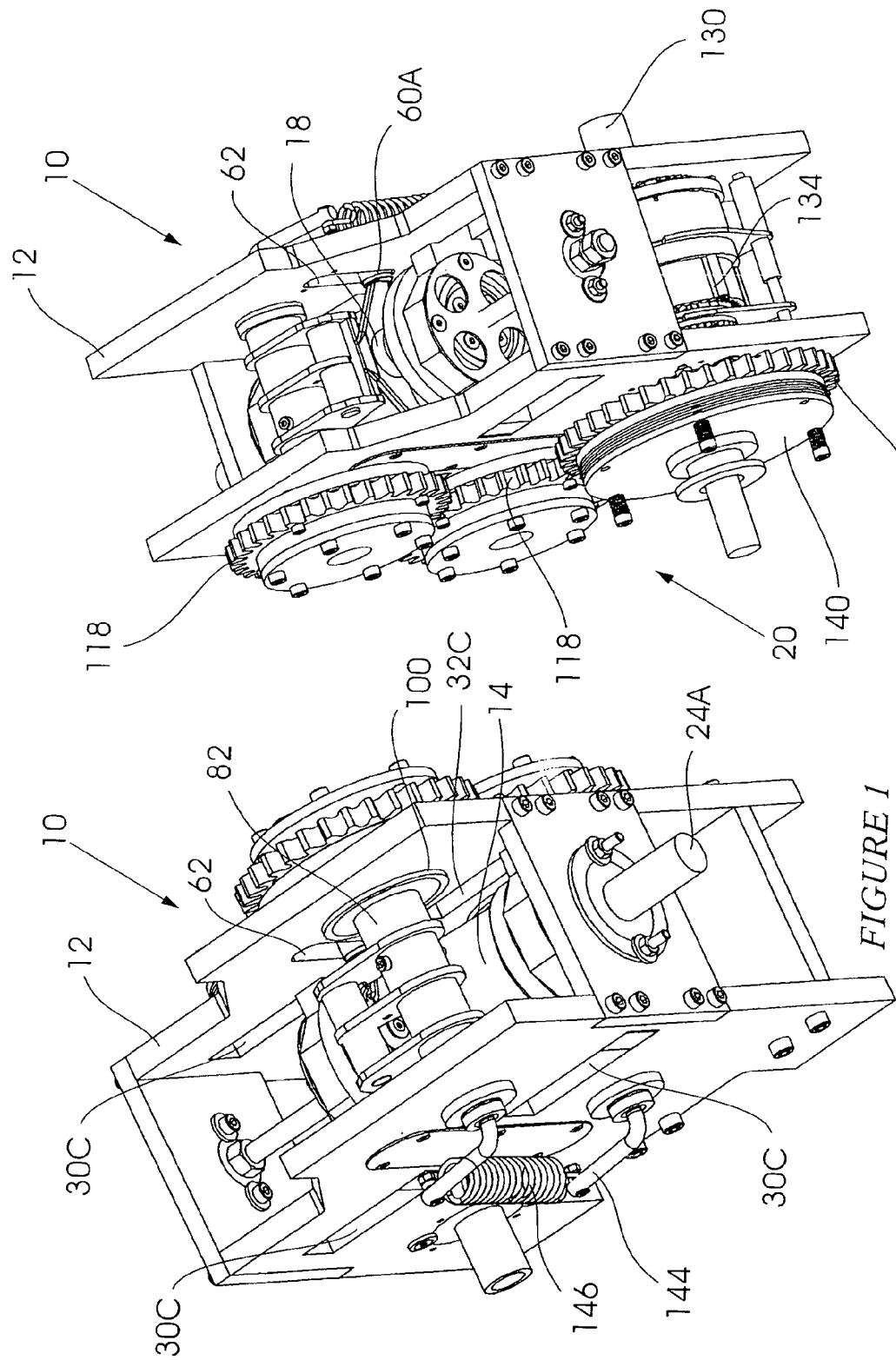
FIG. 1 is a perspective view from one side of a rotor-controlled, ratcheting CVT machine according to one form of the invention.
FIG. 2 is a perspective view of the machine of FIG. 1 from an opposing side.

FIGS. 1 and 2 of the accompanying drawings are perspective views from opposing sides of a rotor-controlled, ratcheting, continuously variable transmission (CVT) machine 10 according to a first form of the invention.

Figure 3:
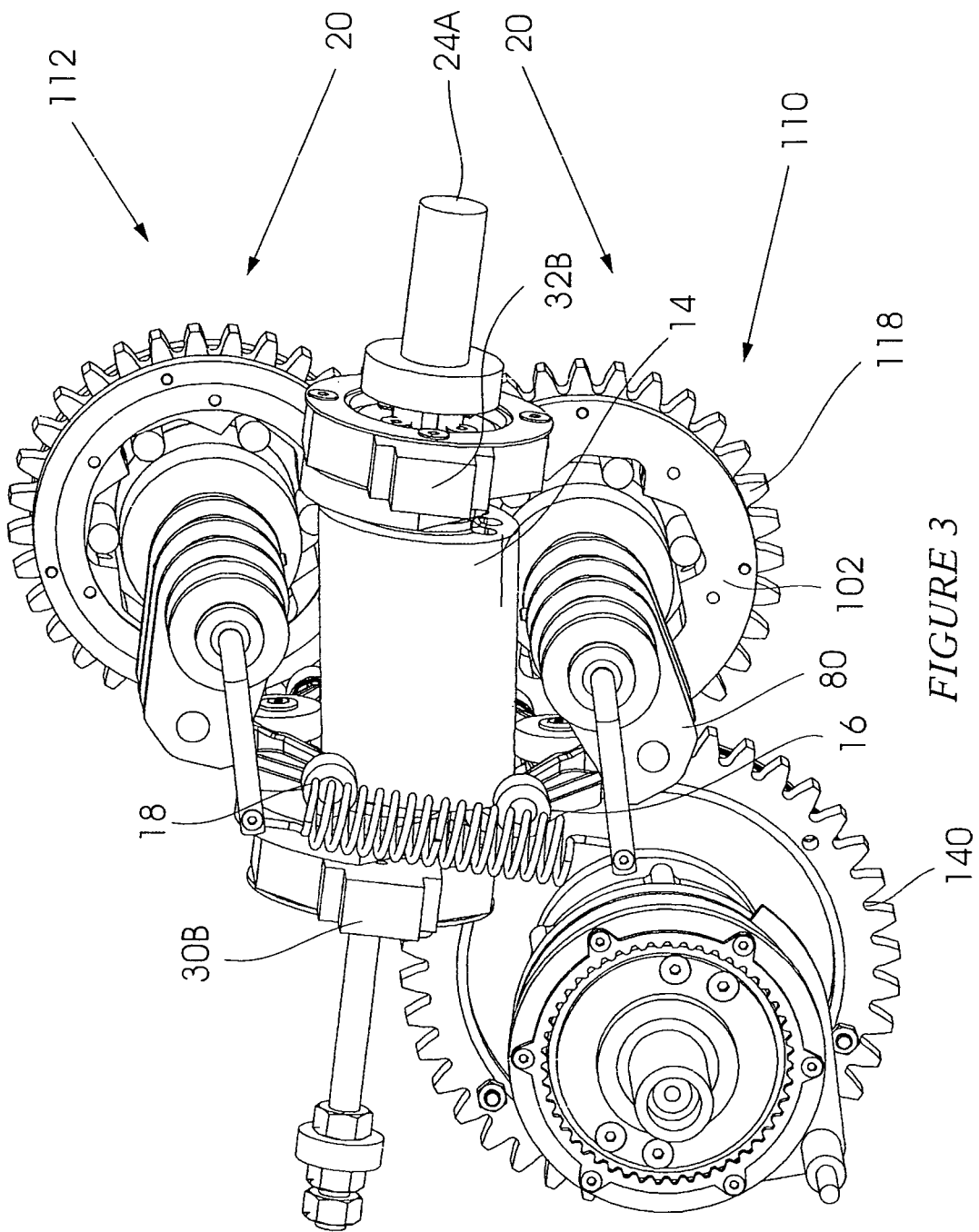
FIG. 3 is a perspective view from one side, on an enlarged scale, of the CVT machine of the invention, with a housing removed to reveal various components, in a high lift mode.

The machine has a housing 12 of any appropriate construction which supports a rotor 14, rotor followers 16 and 18 respectively and an output drive mechanism 20 (see FIG. 3).

Figures 4, 5:
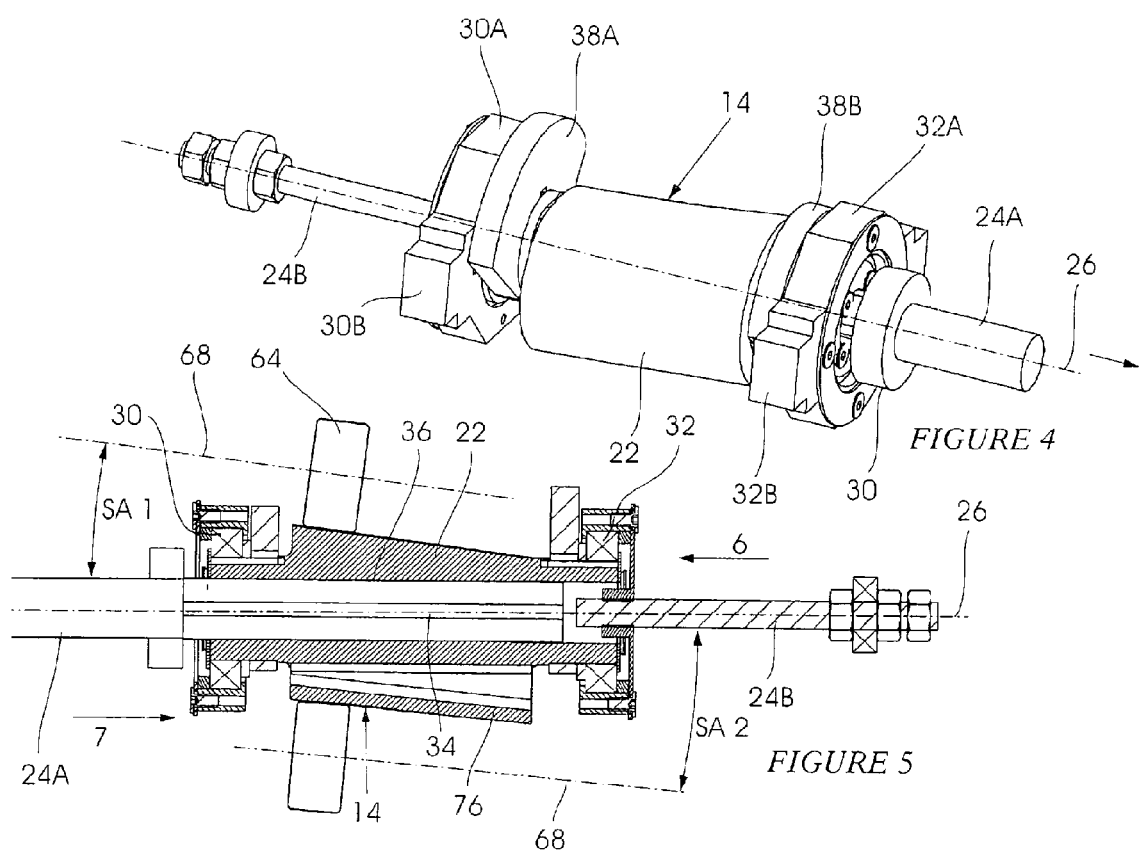
FIG. 4 illustrates, in isolation, the rotor of the machine of the invention.
FIG. 5 shows the rotor in cross-section.

FIG. 4 depicts the rotor 14 in isolation. FIG. 5 is a side-view in cross-section of the rotor.

The rotor includes a variable stroke body 22 from which extend axles 24A and 24B. The rotor has a longitudinal axis 26 which extends in a first direction 28. The rotor is rotatably supported by spaced bearings 30 and 32, mounted in housings 30A and 32A with respective extensions 30B and 32B located in slots 30C and 32C in the housing 12 so that the rotor can be moved, as is explained hereinafter, in the direction 28, relative to the housing 12.

The axle 24A serves as a drive input shaft and has splines 34 which engage with complementary formations in an inner bore 36 of the rotor body. This enables the position of the rotor body to be adjusted in an axial direction, coincident with the first direction 28, during operation. The axle 24B is in the nature of a lead screw, which does not carry any meaningful load from the rotor but which is rotatably actuable, relative to the housing, to move the rotor linearly in either sense in the first direction 28, relative to the rotor followers.

Counterweight components 38A and 38B, at opposed ends of the rotor body, assist in optimizing the static and dynamic balance of the body.

Figure 6:
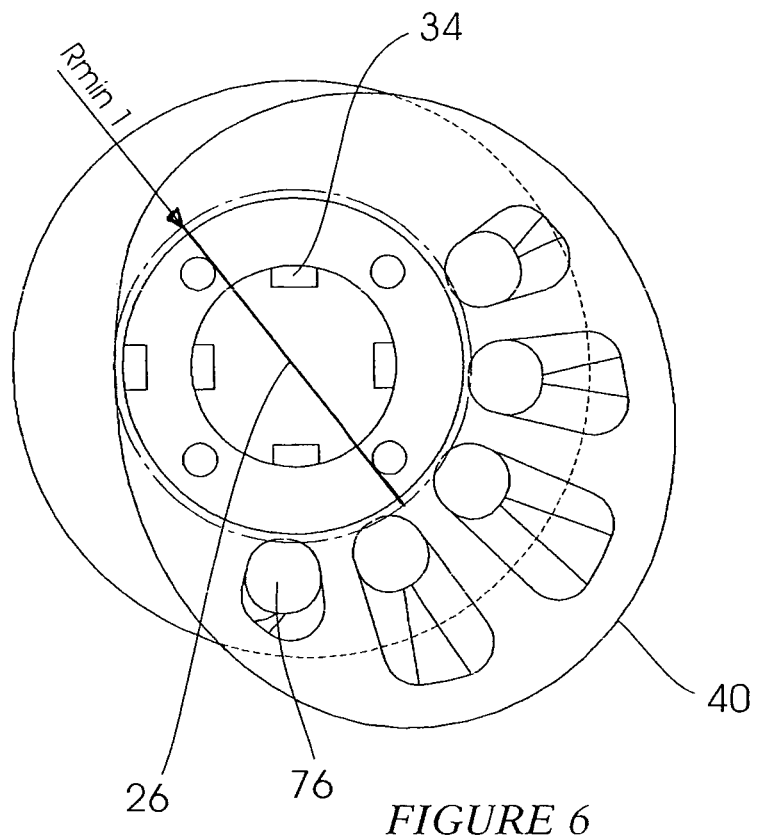
FIGS. 6 and 7 are views from opposing ends of the rotor.
Figure 7:
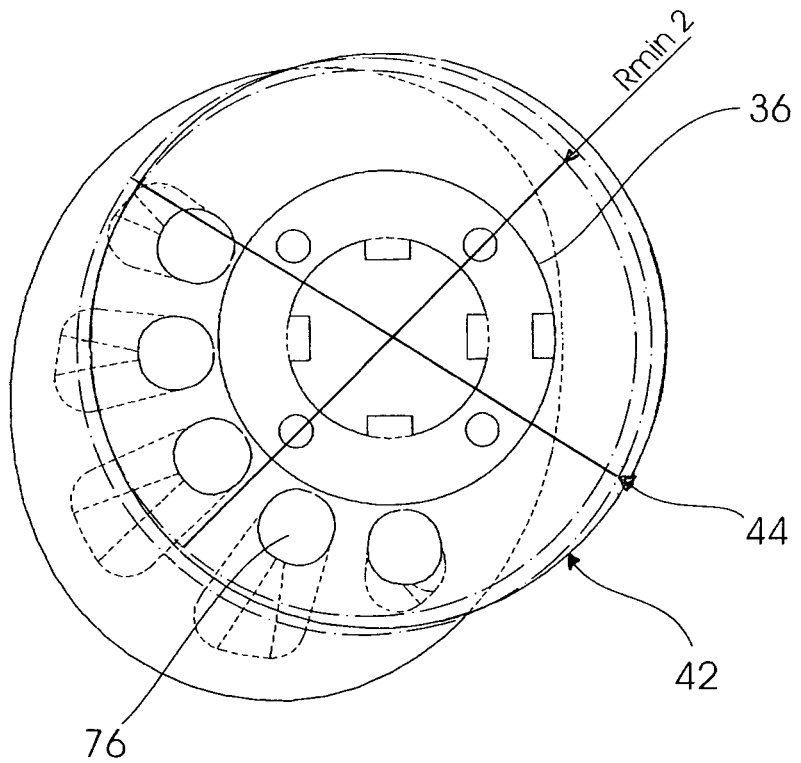

The cross-sectional profile of the rotor body is crucial to the operation of the machine. FIG. 6 is an end view of the body 22 in the direction of an arrow 6, in FIG. 5, while FIG. 7 is a view of an opposing end i.e. in the direction of an arrow 7 in FIG. 5. The circumferential profile of the body, taken on a plane which is at a right angle to the longitudinal axis 26, varies substantially from a profile 40, shown in FIG. 6, at one end of the body which is referred to hereinafter as the high lift section of the body, to a profile 42 at the opposing end of the body, which is referred to hereinafter as the low lift section. At the end, or close to the end, of the low lift section the circumferential profile of the body, designated 44, is circular and constitutes what is referred to herein as a geared neutral point.

Figure 8:
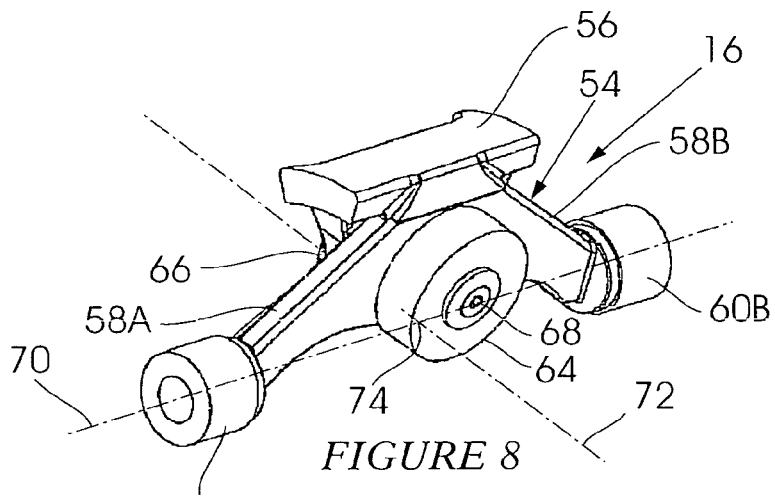
FIG. 8 is a perspective view of a rotor follower.

FIG. 8 illustrates in perspective the rotor follower 16. The rotor follower 18, which is diametrically opposed to the rotor follower 16 relative to the longitudinal axis of the rotor, has a similar construction and therefore is not further described.

The rotor follower includes an inverted, Y-shaped body 54 with a partly circular thrust surface 56 and two limbs 58A and 58B respectively which carry guide rollers 60A and 60B which are located in respective guiding slots 62 formed in the housing 12—see FIGS. 1 and 2. Two rollers 64 and 66 respectively are mounted on opposed sides of the body 54, directly below the thrust surface 56, for rotation about a common axis 68. The guide rollers 62 and 64 are in the form of needle or ball bearings which are rotatable about a common axis 70. This axis, which is centrally positioned between the rollers 64 and 66, directly intercepts a contact line 72 between the rollers 64 and 66 and the outer surface 44 of the rotor body, during use, at what is referred to herein as a thrust point 74. The resultant force which is exerted by the rotor on the roller follower is transmitted through this point in a linear direction away from the longitudinal axis 26 of the rotor.

Figure 11:
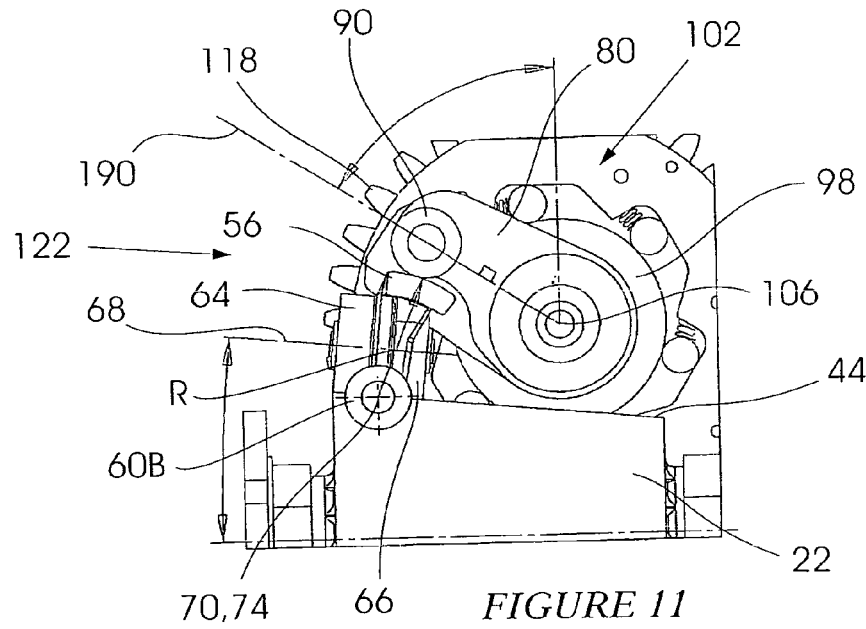
FIG. 11 illustrates the interaction, in one embodiment of the invention, of the rotor, a rotor follower and a rocker arm.

The thrust surface 56, which is more clearly shown in FIG. 11, has a radius of curvature which is centred on the contact line 72 and also on the axis 70. Thus the resultant R of the force exerted on the thrust surface is linearly directed, away from the longitudinal axis, from the thrust point 74 between the rollers 64 and 66. The guide slots 62 act on the guide rollers and ensure that movement of the rotor follower for a given position relative to the rotor is such that the thrust point is kept in a fixed plane which is at a right angle to the axis 26.

At the high lift end the circumferential profile has a minimum radius Rmin1 (FIG. 6). At the low lift section (FIG. 7) the circumferential profile has a minimum radius Rmin2. The minimum radius is linearly scaled from one end of the rotor to the other end. Linear scaling in this respect refers to the pitch curve which represents the centre point of the rotor roller which is first calculated and which results in a rotor with straight line profile's as viewed from the side. When compensation for the diameter of the rollers of the rotor follower is done, to define the actual rotor surface, the straight line profile becomes very slightly curved. This type of adjustment is necessary to ensure that the rotor followers remain in line-contact with the rotor during operation. Thus, in stating that the rotor surface is linearly scaled over its length, it is to be understood that this means that the pitch curve path surface, which is referenced to the centre point of the rotor roller is linearly scaled. Slight variations from the linear surface profile (in a longitudinal sense) which result are thus due only to rotor roller diameter compensation factors.

The linear scaling, done in the manner referred to, is subject to at least one of the following constraints namely:
a) that the length of the circumferential profile of the rotor surface between the high lift section and the low lift section, which extends continuously around the longitudinal axis of the rotor, taken on any plane which is at a right angle to the first direction, is substantially constant; and
b) that the swivel angles (referred to hereinafter) on opposed sides of the rotor axis are substantially equal.

The resulting rotor body, designed with the aforementioned factors in mind, has a number of important benefits.

The straight line profile on the rotor surface, compensated as may be necessary to take account of rotor follower roller diameter size, allows the rotor followers 16 and 18 to make line-contact with the outer surface of the rotor body and this increases the capability of the rotor followers to transmit forces. By optimizing Rmin1 and Rmin2 the minimum radius of curvature on the outer rotor surface is increased and this allows larger rotor followers (rollers) to be used. This in turn increases the force transmitting capabilities of the rotor followers and therefore the power transmission capability of the machine.

Also, by optimizing Rmin1 and Rmin2, the maximum swivel angle SA1 on one side of the longitudinal axis of the rotor can be substantially equal in magnitude to the maximum swivel angle SA2 on an opposing side of the rotor axis (see FIG. 5). The swivel angle is the angle which is subtended by the axis 68 to the longitudinal axis 26 of the rotor. This angle changes, for each rotor follower, from a maximum positive value SA1 to a maximum negative value SA2 as the rollers 64 and 66 are relatively moved, about the rotor, with the thrust point 74 remaining in a single plane which is at a right angle to the axis 26. Consequently the resultant axially directed forces of the rotor followers, whether two, three or more in number, are effectively restricted and preferably minimized. As the forces depend on the sine values of the swivel angles exact equality is not essential and, in practice, one angle can vary by up to, say, 20% relative to the other angle.

A further benefit which flows from optimising Rmin 1 and Rmin 2 is that the rotor length between the high lift section and the low lift section is effectively reduced. More material is added to the low lift end of the rotor body and static and dynamic balancing of the body becomes more feasible. Reference is made in this respect to FIGS. 6 and 7 which illustrate a plurality of longitudinally extending passages 76 which go from one end of the body to the other end. FIG. 5 shows that the passages vary in cross-section and are circumferentially spaced from each other over a portion of the body. By careful design, weight distribution per unit length in an axial direction of the body can be optimized to achieve effective static and dynamic balancing. This technique is not possible if the circumferential profile of the body at any point along its length has the same minimum radius.

Another benefit, which is further described hereinafter, relates to the capability of the rotor, with appropriate design of a connection arrangement between the rotor followers and rocker arms, to convert, in a strictly linear manner, linear movement of a rotor follower into rotational movement of the rocker arms.

Figure 9:
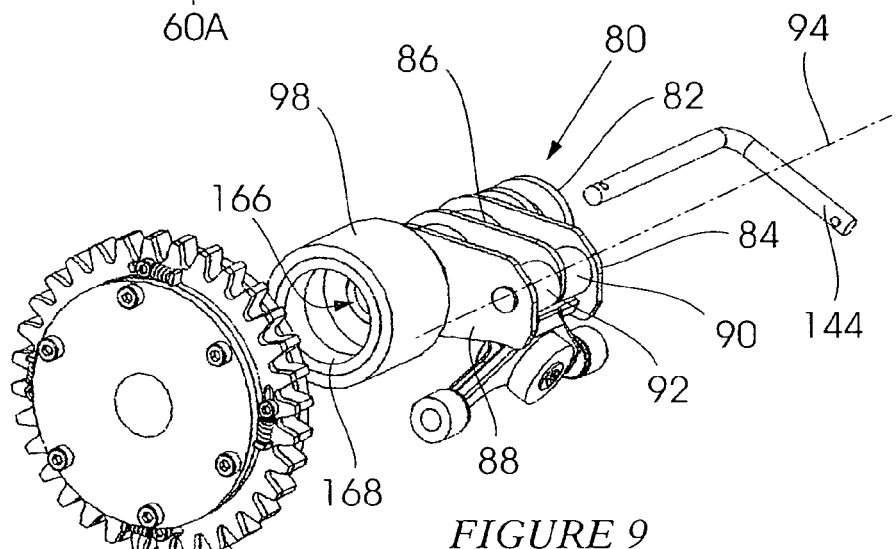
FIG. 9 shows, from the side, a rocker arm, which drives a one-way clutch, engaged with a rotor follower.
Figure 9:
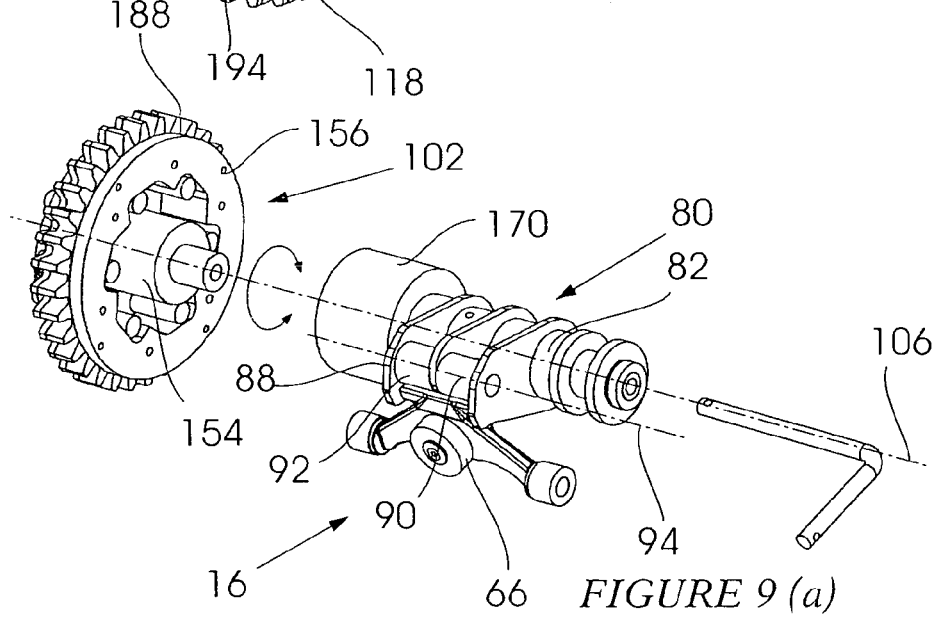

FIG. 9 depicts a rocker arm 80 associated with the rotor follower 16 from one side and FIG. 9(a) shows the arrangement from an opposing side. The rocker arm has a stepped, central hollow shaft 82. Three plates 84, 86 and 88 project from the shaft. Rollers 90 and 92, which are mounted for rotation about a common axis 94, are positioned between the plates 84 and 86 on the one hand and 86 and 88 on the other hand. The central plate 86 is of reduced dimension on its lower side and thus does not project beyond the lower surfaces of the rollers 90 and 92 which are positioned to ride on the thrust surface 56 of the body 54 of the rotor follower.

The shaft 82 has a large, circular, hollow end 98 which is engaged with the casing 12 by means of an outer bearing 100 (FIG. 1). The end projects through the casing and terminates in a one-way clutch 102. The rocker arm is designed to have reduced inertia around the hollow shaft 82. Simultaneously, the diameter of the large diameter section 98 which forms part of the one-way clutch is increased to maximize the torque capacity of the one-way clutch. The rocker arm 80 is thus mounted for oscillatory rotational movement, relative to the housing, about an axis 106 which is centred on the shaft 82.

The output drive mechanism 20, shown in FIG. 3, includes a first output drive device 110 and a second output drive device 112 which, for all practical purposes, is the same as the output drive device 110. The output drive device 110 includes the rocker arm 80, the one-way clutch 102, and an associated output gear 118. The rotor follower 16 acts on the rocker arm 80 in the manner shown in FIG. 11 (referred to herein as a connection arrangement 122). In this arrangement the rollers 90 and 92 on the rocker arm bear against the partly circular thrust surface 56 of the rotor follower body and, as has been pointed out, thrust is exerted on the rocker arm, linearly outwardly from the thrust point 74.

The output gear 118 is meshed with the corresponding output gear of the other drive device, see FIG. 2, so that these gears are rotatable in unison. Drive is transferred from these gears to a final drive shaft 130 via a gear 132 and gear assembly 134. The components 132 and 134 may be of any appropriate kind and are designed to achieve a final output drive speed, according to requirement. A clutch 140 could be included in the gear 132 to provide additional control between the output gears 118 and the output drive shaft 130, if required.

A torsion bar lever 144 projects from the shaft 82 and is situated on an outer side of the housing 12. A spring 146 interconnects the two torsion bar levers—see FIG. 1. The action of the spring is such as to urge the corresponding rotor followers into line-contact with the outer surface of the rotor body, at all times. The use of the torsion bar levers reduces the load capacity required of the spring because the two rocker arms, and thus the torsion bar levers, tend to move more or less in unison. The spring is thus only required to compensate for differences in movement of the two levers.

Figure 10:
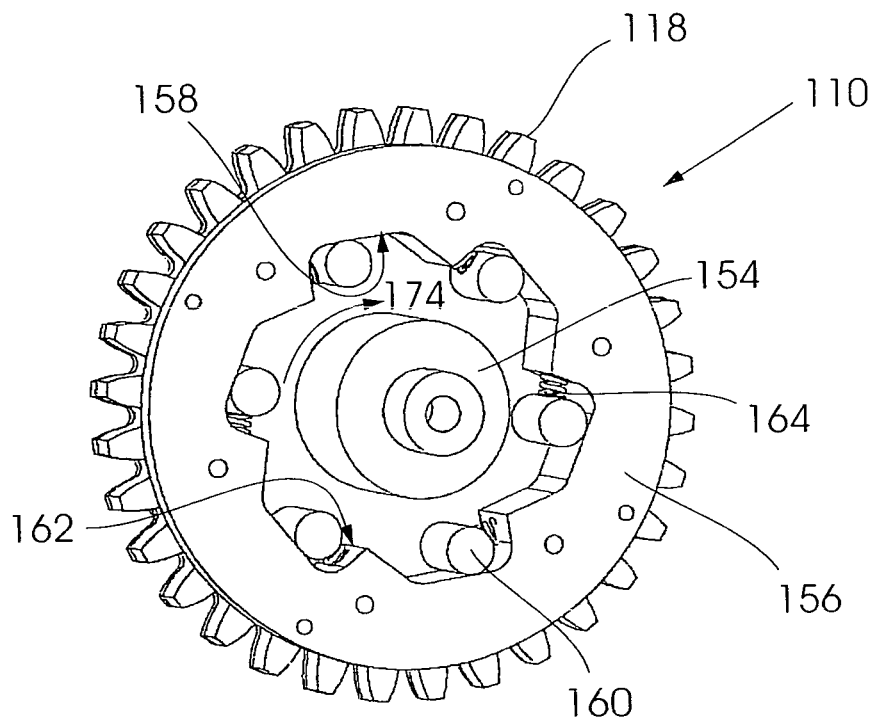
FIG. 10 is a view from one side of the one-way clutch.
Figure 10:
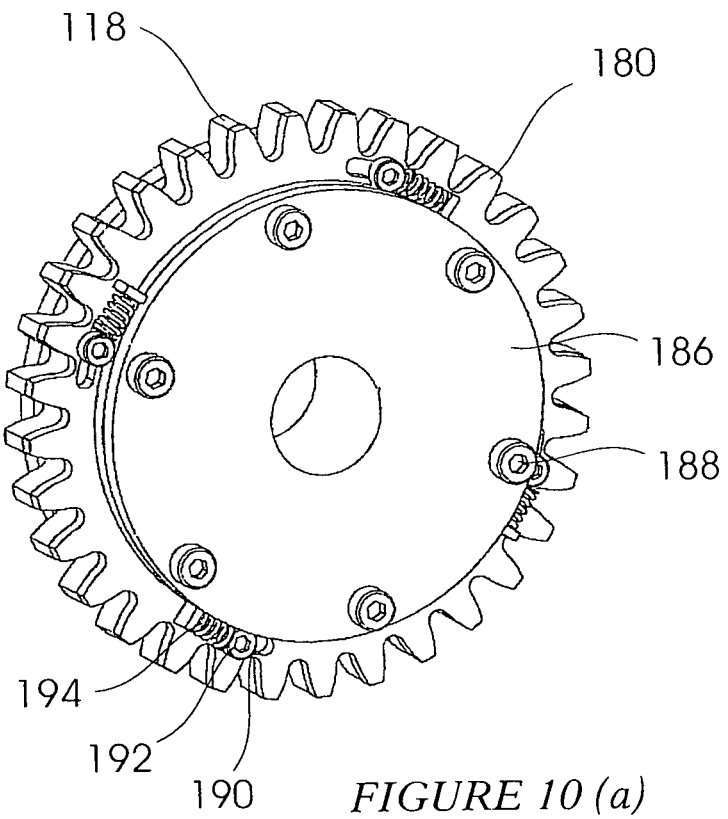

FIG. 10 shows the one-way clutch 110 which is coupled to the output gear 118 from one side and FIG. 10(a) shows the clutch from an opposing side. The one-way clutch 102 and the output gear 118 are designed to address negative factors which could arise during operation of the machine. In order to reduce, yet further, the load of the spring 146 which is required to keep the oscillating components together, the inertia associated with each rocker arm must be minimized. Appropriate design of the clutch assists in achieving this objective.

The one-way clutch 102 includes a central circular boss 154 and an outer race 156 which has a profiled ramp surface 158. A number of rollers 160 are positioned in respective recesses 162 which form part of the profiled ramp surface. Springs 164, attached to the surface, support the rollers.

The large diameter hollow end 98 of the hollow shaft 82 extends over the central boss 154 and has needle bearings 166 and 168 on its inner surface to facilitate low frictional movement of the end over the boss 154. An outer surface 170 of the large diameter end forms a smooth circular inner race for the clutch. The rollers 160 are closely positioned adjacent the outer surface 170. The springs 164 bias the rollers away from the profiled ramp surface towards the outer surface 170. The arrangement is such that, referring to FIG. 10, if the outer surface 170 of the large diameter end is rotated in the direction of an arrow 174 the rollers are wedged between opposing sides of the outer surface 170 and the profiled ramp surface and rotational drive is thus transferred from the shaft 82 to the outer race and hence to the gear 118. The rocker arm is of course oscillated and, when it moves in a direction which is opposite to the arrow 174, the rollers permit such movement without transferring rotational movement to the output gear.

The importance of this arrangement lies in the fact that the rollers are not rotated together with the shaft 82 on the return stroke. Thus the rollers are not subjected to accelerative forces and a smaller force, exerted by the springs 164, can be used on the rollers. This results in less wear and lower drag for the inertia of the system is reduced.

One of the output drive devices is designed to eliminate backlash which can occur between the meshing output gears 118. Referring to FIG. 10(a) a backlash gear 180 which has an identical profile to the corresponding output gear 118 is superimposed on the output gear. The gear 118, the outer race 156 and a plate 186 which is integral with the central boss 154 are fixed together using bolts 188. The backlash gear 184 is rotatable to a limited extent relative to the output gear 118 by virtue of slots 190 through which fasteners 192 pass. The backlash gear is spring-loaded in one direction by means of a plurality of backlash springs 194 which act between the respective fasteners and the backlash gear.

The backlash gear and the springs function to remove any backlash which might occur between the engaged output gears 118. Such backlash occurs when one output gear 118 is freewheeling and torque in the opposite direction is generated due to the drag created by the rollers 160 which are in contact with the outer surface 170 of the shaft 82 under the force of the roller springs 164. The requirement for the backlash springs 194 is that they must create a torque which is larger than the drag torque generated when the respective output device freewheels.

In operation of the machine 10 input rotational drive is applied to the rotor by connecting a prime mover of any appropriate kind to the protruding axle 24A. The rotor body is then rotated about its longitudinal axis 26. The rollers 64 and 66 of the rotor followers are urged, at all times, into contact with the outer surface 44 of the rotor body by virtue of the biasing action of the torsion bar levers 144 and the spring 146.

The circumferential profile of the rotor body, taken on a plane which is at a right angle to the longitudinal axis of the rotor, varies from the high lift end to the low lift end. At the high lift end the rotor follower is moved radially outwardly and inwardly to a far greater extent than at the low lift end. The rotor can be moved in an axial direction along the splined axle 24A by any external device, for example a motor, a hand-operated mechanism or the like, which operates (in this example) on the lead screw 24B to urge the rotor in one direction or the other relative to the housing, and hence relative to the rotor followers, according to requirement. As the rotor is moved the stroke of the machine, i.e. the degree of lift, is varied accordingly.

If the stroke is zero, the rotor followers are not lifted at all. This is achieved by constraining the thrust points 74 of the rotor followers to ride on the circular profile 44 shown in FIG. 7. Line-contact between the rotor and the rollers of the rotor followers is still maintained. The rollers do not follow a circular path and pivot slightly in one direction and then the other as the respective intermediate thrust point moves on the circular path. This feature, which allows a geared neutral output to be achieved without making use of a clutch or torque converter, constitutes a significant benefit for the drive train downstream of the CVT machine is also simplified.

FIG. 11 depicts a rotor follower being moved linearly outwardly to a maximum extent. The rocker arm 80 is rotatably moved about the axis 106 to a limiting position shown by a dotted line 190. Conversion of the linear movement of the thrust point 74, between the rollers 64 and 66, to rotational movement of the rocker arm, is done in a linear fashion i.e. for each unit of linear movement a corresponding unit of angular movement is achieved with the ratio between the units being determined by the position of the rotor followers on the rotor i.e. the degree of lift, which, in turn, is dependent on the linear position of the rotor (adjusted by moving the rotor along the axle 24A) relative to the thrust point 74.

The oscillatory rotational movement of the rocker arm is transferred, as has been explained, to the outer race 156 of the corresponding one-way clutch and hence to the associated output gear 118.

Figure 17:
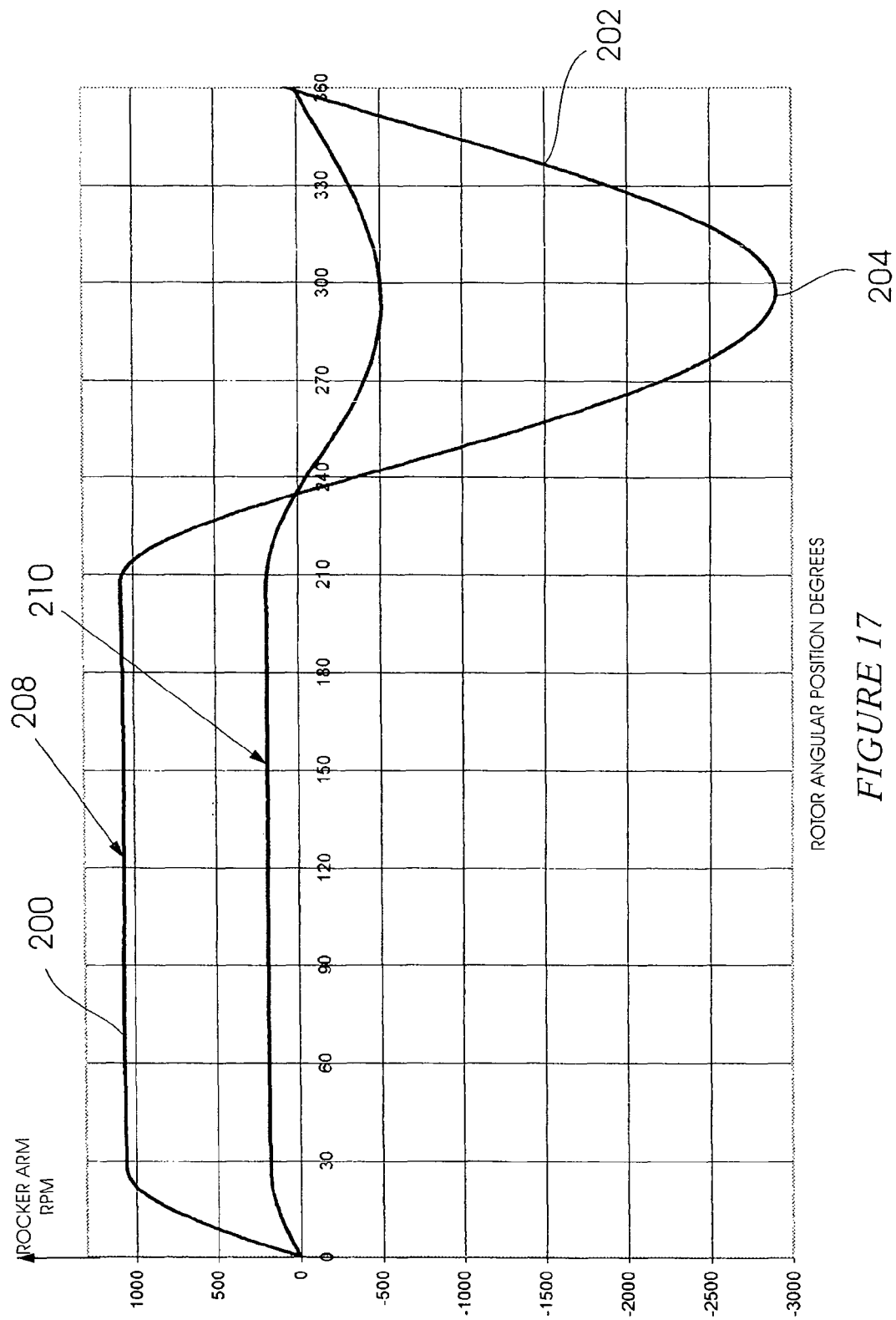
FIG. 17 is a curve of rocker arm rotational speed versus rotor position achieved with the machine of FIG. 1, and of FIG. 12.

FIG. 17 shows the relationship of the rotational speed of a rocker arm to the position of the rotor, as it rotates. For a fixed input rotational speed applied to the drive axle 24A the rotor follower 16 produces constant rotational drive 200 on the corresponding rocker arm and hence on the associated output drive gear 118. Thereafter, due to the one-way clutch effect, the positive speed drops, following a substantially sinusoidal curve 202, to a maximum negative value 204 whereafter it again increases, after a further rotation of about 180° of the rotor, to the constant output speed 200. A similar effect, but 180° out of phase with the illustrated curve, is achieved with the other rotor follower and rocker arm assembly (this is for a CVT machine which has two rotor followers, each effective, as described, over about 180°). As the gears are meshed the output speed (at the rotational value marked 200) imparted to the shaft 130 is constant. This effect is manifested at different input drive speeds and for different linear positions of the rotor relative to the rotor followers.

FIG. 17 indicates an upper high output speed 208 and a substantially lower output speed 210. The transition between the speeds is achieved smoothly as the position of the rotor is adjusted linearly relative to the thrust points established by the rotor followers.

Figure 12:
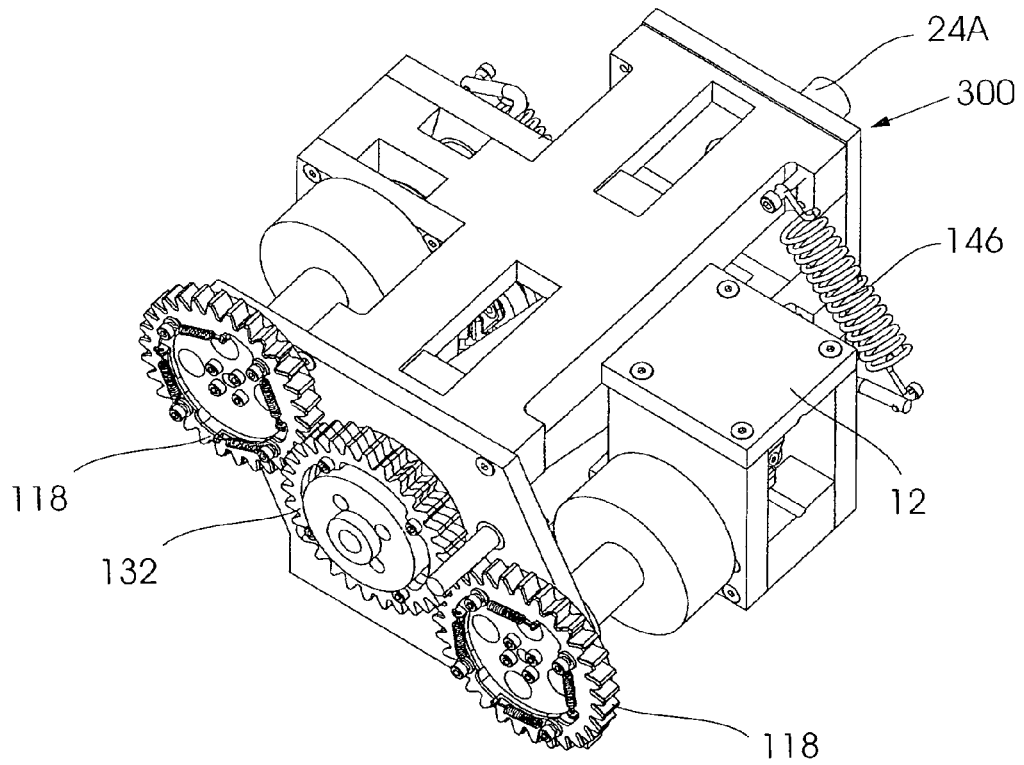
FIG. 12 is a perspective view of a rotor-controlled CVT machine according to a second form of the invention.
Figure 13:
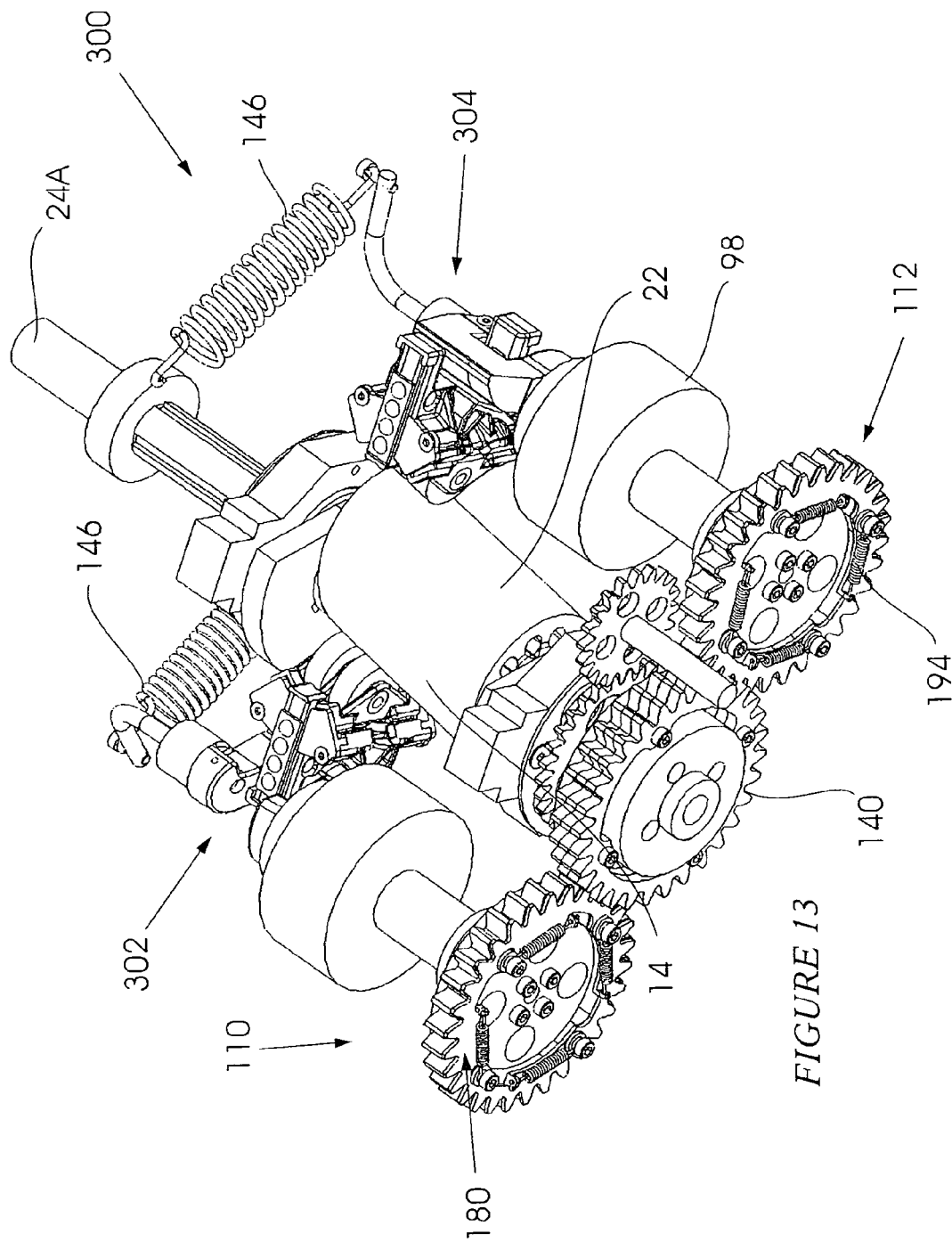
FIG. 13 shows inner components of the machine of FIG. 12 which are revealed by omitting a housing.

FIG. 12 (with housing) and FIG. 13 (without housing) illustrate in perspective a continuously variable transmission machine 300 according to a second embodiment of the invention. The machine has many similarities in working principle to the machine 10 and for this reason a full description is not made of the machine 300. Where applicable like reference numbers are used to designate like components.

Figures 14, 14A:
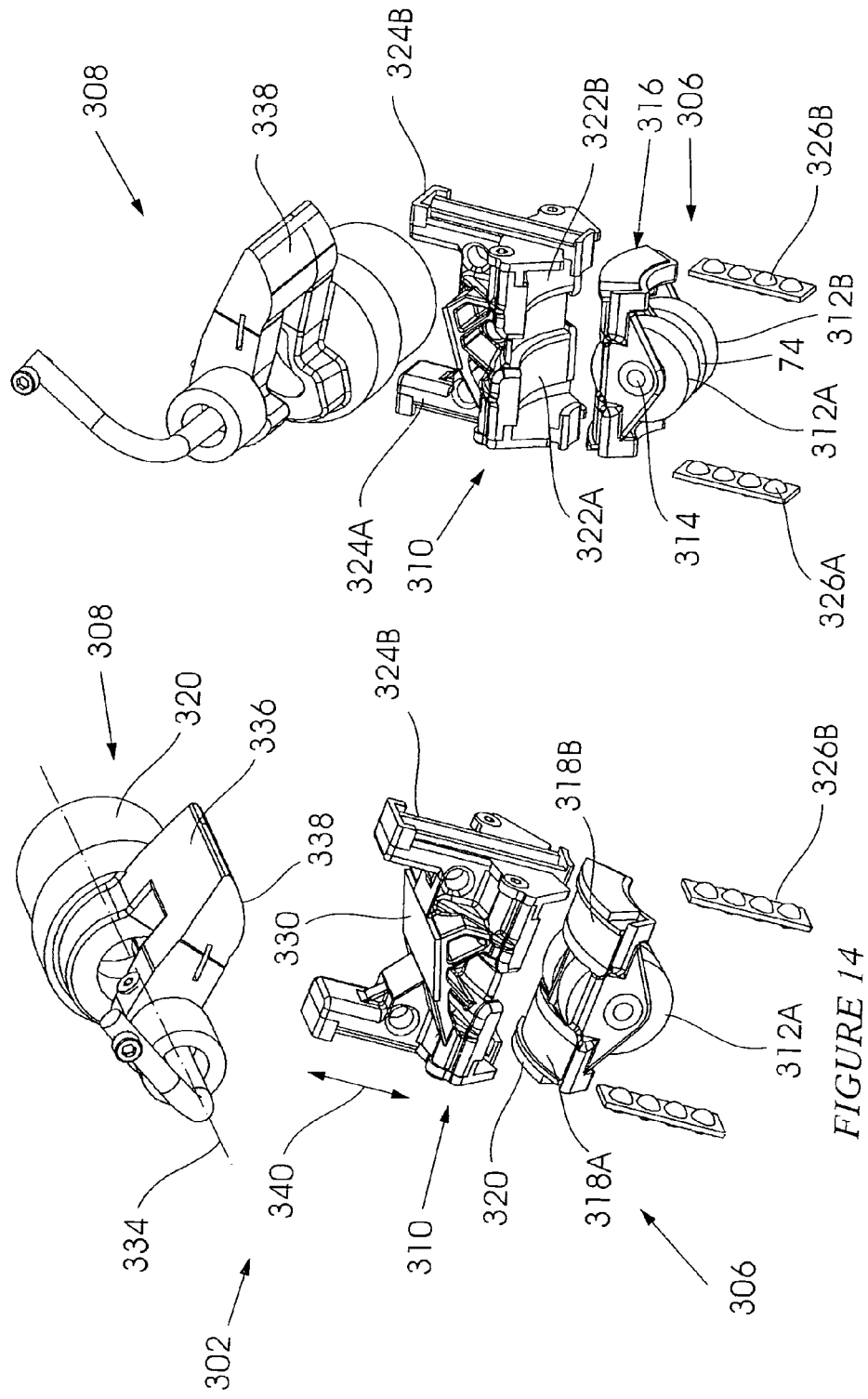
FIG. 14 shows the interaction, according to a second form of the invention, of a rotor follower and a rocker arm to achieve linear conversion of linear movement to rotary movement.
FIG. 14(a) shows the components of FIG. 14 from an opposing side.
Figure 15:
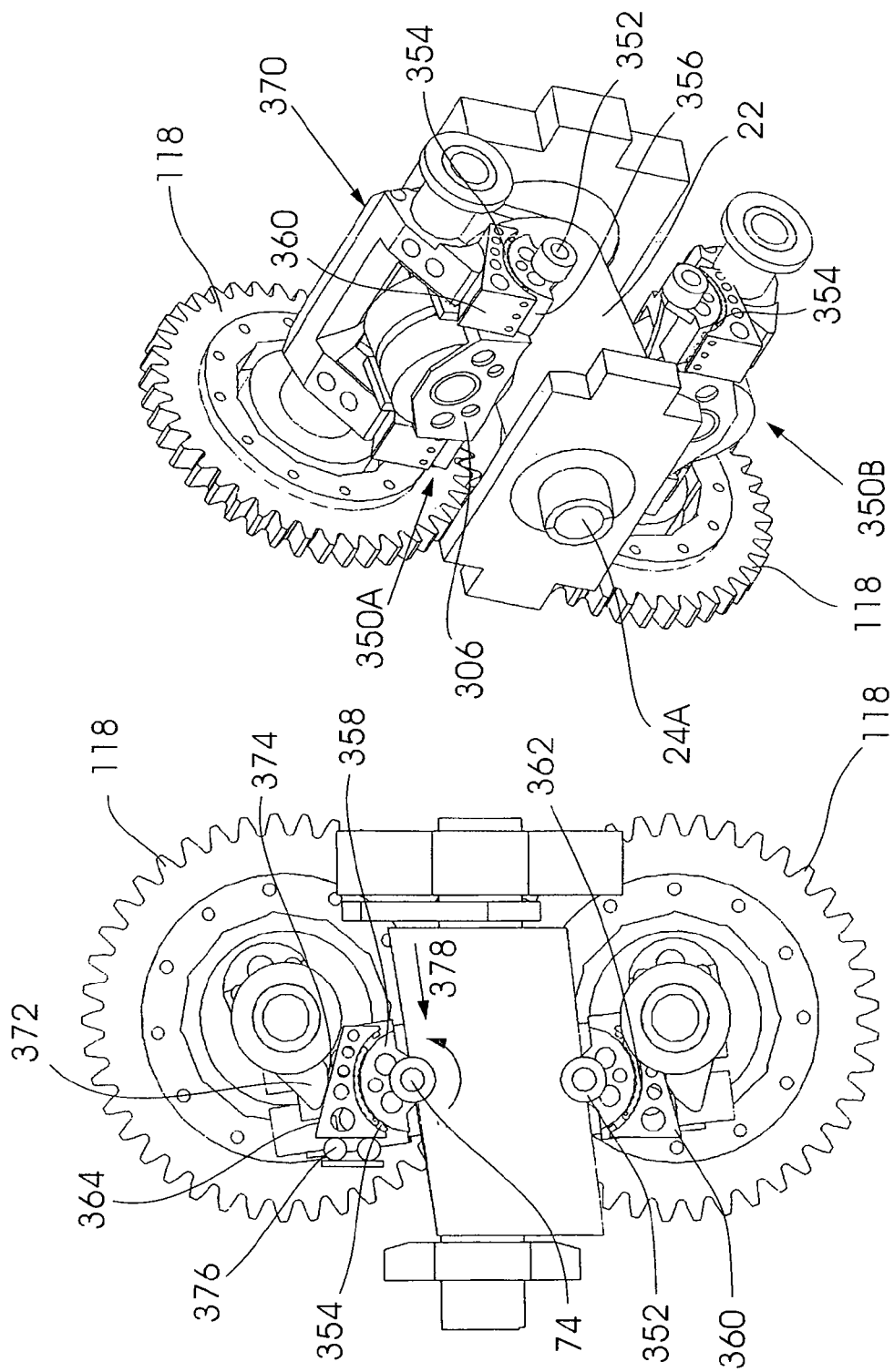

A primary difference between the two machines lies in the connection arrangement used to translate, in linear fashion, linear movement of a rotor follower into angular movement of a corresponding rocker arm. FIGS. 14 and 14(a) show one way of doing this while FIGS. 15 and 15(a) show an alternative way.

With the machine 10 the desired linear translation of movement is achieved for a limited angular rotation of the rocker arm of about 30°. Outside of this range the conversion is no longer linear. The arrangement shown in FIG. 11 works well only when a high reduction between the input rotational speed of the machine and the output rotational speed of the machine is required.

The problem of increasing the degree of angular rotation of the rocker arm is addressed by making use of an involute curve on the rocker arm which interacts with an angled or inclined flat surface actuated by the rotor follower. The involute rocker arm curve is equivalent to a gear tooth or pinion of a rack and pinion arrangement while the flat surface, which is actuated by the rotor follower, is equivalent to the rack. The components interact as a rack and pinion arrangement and convert linear motion to rotational movement in a constant linear fashion for angular movement of the rocker arm of up to about 60°.

FIG. 13 illustrates a rotor 14 which causes incremental power transfer movement of two output drives 110 and 112 via respective connection arrangements 302 and 304, substantially in the manner which has been described hereinbefore. The connection arrangements are identical. FIG. 14 illustrates the arrangement 302 in perspective and exploded form from one side. FIG. 14(a) shows the arrangement from a different side.

The connection arrangement 302 includes a rotor follower 306, a rocker arm 308 and an intermediate carriage structure 310. The rotor follower has two rollers 312A and 312B mounted for rotation about a common axis 314 which extends through a support member 316. Two partly circular bearing surfaces 318A and 318B are formed on a side of the member opposing the structure 310. Each bearing surface is flanked by part of a respective thrust needle bearing 320.

The carriage structure 310 has needle bearings 322A and 322B which engage with the bearing surfaces 318A and 318B respectively. Slider formations 324A and 324B respectively are on sides of the structure 310 opposing each other. Linearly disposed bearing arrangements 326A and 326B respectively are engaged with the slider formations and are mounted to suitable structures, not shown, in the housing 12. In this way the carriage structure 310 is constrained to move linearly only.

A flat, angled rack surface 330 is positioned centrally on a side of the structure 310.

The rocker arm 308 includes support structure 320, similar to that used for the machine of FIG. 1, suitably mounted to the housing 12, which allows for oscillatory rotational movement of the rocker arm about an axis 334. A force transmitting component 336, which is in the form of a gear tooth, has an involute surface 338 which bears against the rack surface 330. The arrangement is similar to what is encountered in a rack and pinion gear set.

In use, when the rotor follower is reciprocated by rotor movement, the structure 310 is similarly moved along a line 340. However, due to the rotational facility afforded by the curved bearing surfaces 318A and 318B, the rotor follower can pivot transversely to the direction of linear movement to a limited extent to take account of the changing profile of the rotor surface against which the rollers 312A and 312B bear. The linear movement of the structure 310 is translated into oscillatory rotational movement of the rocker arm about the axis 334 in a linear fashion. The rocker arm can rotate by up to about 60° in a linear conversion fashion and this assists considerably in the operation of the machine 300 when the degree of speed reduction between the input and output shafts of the machine is relatively low.

FIGS. 15 and 15(a) show, in different views, alternative connection arrangements 350A and 350B respectively for the output drive of the machine.

In each connection arrangement the rotor follower 306, suitably constrained by guide rollers 352 mounted to slots (not shown) in the machine housing, causes reciprocating linear movement of a needle bearing race 354 which is engaged with a circular thrust-exerting surface 356 of a shaped member 358 at an extremity of the rotor follower. A guide wedge 360 has a circular bearing surface 362 which acts against the needle bearing, and an outer rack surface 364 which is flat and angled, much in the nature of the surface 330 shown in FIG. 14. A rocker arm 370 which is engaged with a respective output drive gear 118, in the manner which has been described hereinbefore, has a pair of projecting pinions 372 each of which has a curved surface 374, which follows an involute profile, in direct contact with the flat rack surface 364 which is presented by a corresponding wedge member. The needle bearing 354 allows limited oscillatory rotational movement of the member 358 relative to the guide wedge 360, as necessary, in order to take account of the changing surface profile of the rotor. The guide wedge is constrained to move linearly by suitable supporting structure e.g. rollers 376 in the machine housing—see FIG. 15. The guide wedge is always biased towards the rollers 376, in the direction of an arrow 378, because of the effect of the angled flat rack surface 364.

The connection arrangement 350A has the same advantages as the connection arrangement 302 in that linear conversion of linear movement of the rotor follower to rotational movement of the rocker arm is possible over an extended angular range, up to about 60°. This allows for a lower overall reduction of rotational speed of the CVT machine between its input and output shafts, and also results in a compact design.

Figure 16:
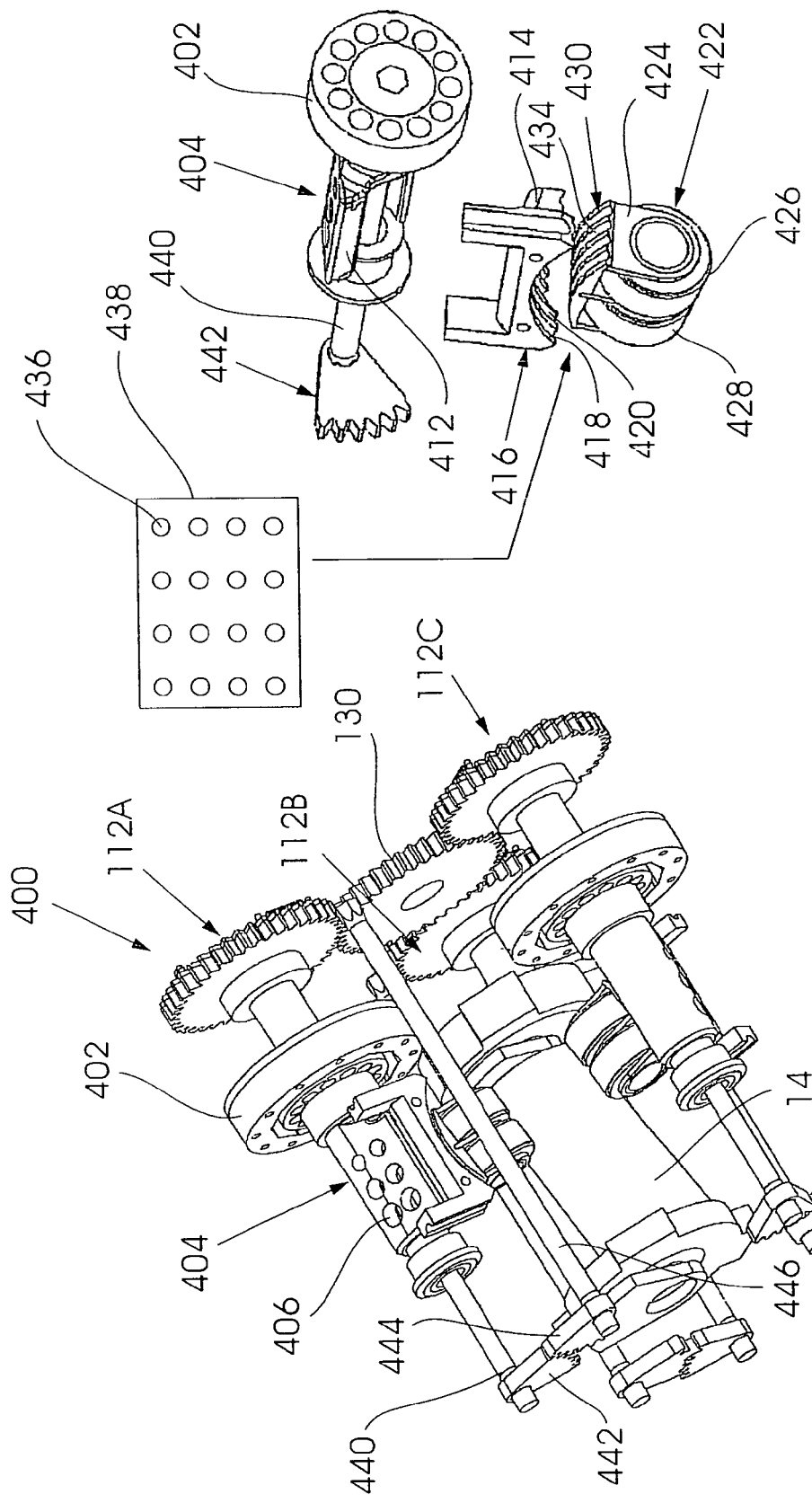

FIG. 16 illustrates a CVT machine 400 (outside of its housing) which has many similarities to the machines described hereinbefore. These features are not further described and, instead, emphasis is placed on the differences.

The machine 400 includes three output drive devices 112A, 112B and 112C which are circumferentially displaced, effectively at 120° from each other, about a centrally positioned rotor 14. The drive devices are substantially identical and for this reason the drive device 112A only is described.

Output gears of the drive devices are meshed to drive a main output gear 130.

The output drive 112A includes a one-way clutch 402 which is driven by a rocker arm 404 which, after suitable stress analysis, is formed with a plurality of holes 406 to minimize its weight and hence its inertia. As is shown in FIG. 16(*a*) the rocker arm has an involute surface 412 which opposes a flat rack surface 414 carried by a carriage 416 which has a semi-circular thrust surface 418 in which is formed a plurality of parallel grooves 420.

A rotor follower 422 has structure 424 which supports spaced rollers 426 and 428 respectively. A thrust surface 430 of the structure has a number of spaced parallel grooves 434 which are transverse to the grooves 420. Ball bearings 436 which are carried by a pliable support 438 are located in the grooves 420 and 434. This arrangement is particularly utile for it permits limited rotational movement of the rotor follower relative to the carriage in two transverse directions.

A torsion bar or rod 440 extends from the rocker arm and a gear member 442 is mounted to an end thereof. As is shown in FIG. 16 this gear is meshed with a similar gear member 444 which is mounted to an end of a torsion rod or bar 446 fixed to the housing (not shown). The torsion bar arrangement fulfils the function of the spring 146 and torsion bar levers 144 shown for example in FIG. 1 in that the torsion members 440 and 446 act at all time to urge the rocker arm into close engagement with the rack surface and, in turn, the roller follower into close contact with the rotor. Inertia of the system is reduced for the mass of moving parts is also reduced.

The rotor 14 is profiled so that each output drive device produces linear movement, equivalent to that shown in FIG. 17, over about 120°. For the remaining 240° of rotation of the rotor the rocker arm goes through a negative curve which is similar to the curve 202 shown in FIG. 17. As this occurs over 240°, and not 180° as is the case with the machine 10, the rate at which the speed of the rocker arm changes (acceleration/deceleration) while it returns to a positive linear output driving position, is reduced. This also helps to reduce the inertia of the system and, as a consequence, the machine 400 can operate at substantially higher rotational speed.

The invention claimed is:

1. A continuously variable transmission machine, comprising:
a rotor, with straight line profiles, which is rotatable about a longitudinal axis which extends in a first direction and which has a variable stroke body with a low lift section, a high lift section, and a surface which extends continuously in a circumferential sense about the longitudinal axis between the low lift section and the high lift section;
an output shaft;
a plurality of rotor followers, engaged in line-contact with the rotor, which are linearly movable in the first direction relative to the rotor, each rotor follower including a respective rotor follower axis and a thrust point which is linearly movable relative to the longitudinal axis of the rotor upon rotation of the rotor; and
an output drive mechanism, responsive to movement of the rotor followers, for causing rotation of the output shaft at a speed which is dependent, at least, on the rotational speed of the rotor and on the linear position of the rotor followers relative to the rotor,
wherein each rotor follower, for a given linear position relative to the rotor, is movable between a first limiting angular position at which the rotor follower axis subtends a first maximum angle to the longitudinal axis of the rotor and a second limiting angular position at which the rotor follower axis subtends a second maximum angle to the longitudinal axis of the rotor,
wherein the first maximum angle is approximately equal in magnitude to the second maximum angle, and
wherein an entire length of a circumferential profile of the rotor surface, on a plane between the low lift section and the high lift section and at a right angle to the longitudinal axis, remains substantially constant from any first plane between the low lift section and the high lift section and at a right angle to the longitudinal axis to any second plane between the low lift section and the high lift section and at a right angle to the longitudinal axis, where said second plane is distanced from said first plane along said longitudinal axis.

2. The machine according to claim 1 wherein each rotor follower includes at least one cylindrical roller, rotatable about the rotor follower axis, which bears against the rotor surface and which remains in line-contact with the rotor surface as the rotor follower is moved linearly in the first direction relative to the rotor.

3. The machine according to claim 2 which includes a biasing mechanism which continuously biases each cylindrical roller into line-contact with the roller surface.

4. The machine according to claim 3 wherein the biasing mechanism includes, at least, one of the following: a torsion bar and a spring.

5. The machine according to claim 1 wherein, at or near the low lift section, the rotor surface has a circumferential profile, centred on the longitudinal axis, which is circular and along which the thrust point is movable, without moving in the direction of the longitudinal axis, to provide a geared neutral output.

6. The machine according to claim 1 wherein the rotor body is formed with at least one passage which extends between the low lift section and the high lift section and which has a cross section which is varied to optimize static and dynamic balancing of the rotor body.

7. The machine according to claim 1 wherein the output drive mechanism includes at least first and second output drive devices, and each output drive device respectively includes a rocker arm, a connection arrangement which linearly converts linear movement of the thrust point of a respective rotor follower into oscillatory rotational movement of the rocker arm about a rocker arm axis, an output gear, and a one-way clutch which acts between the rocker arm and the output gear thereby to cause rotation of the output gear in one direction, and wherein at least one output gear includes a drive gear, a backlash gear superimposed on the drive gear, and a backlash biasing arrangement which biases the backlash gear in a rotational direction relative to the drive gear, thereby at least to reduce backlash between the output gears of the output drive devices.

8. The machine according to claim 1 wherein the output drive mechanism includes at least first and second output drive devices, and each output drive device respectively includes a rocker arm, a connection arrangement which linearly converts linear movement of the thrust point of a respective rotor follower into oscillatory rotational movement of the rocker arm about a rocker arm axis, an output gear, and a one-way clutch which acts between the rocker arm and the output gear thereby to cause rotation of the output gear in one direction, and wherein the connection arrangement is selected from the following configurations:
   a) a configuration in which a roller is mounted to the rocker arm and the rotor follower has a partly circular thrust surface centred on the thrust point, which bears against the roller; and
   b) a configuration in which a rack member with an angled flat rack surface is movable by the rotor follower and the rocker arm has an involute thrust surface which bears on the flat rack surface of the rack member.

9. The machine according to claim 1 wherein the output drive mechanism includes at least first and second output drive devices, and each output drive device respectively includes a rocker arm, a connection arrangement which linearly converts linear movement of the thrust point of a respective rotor follower into oscillatory rotational movement of the rocker arm about a rocker arm axis, an output gear, and a one-way clutch which acts between the rocker arm and the output gear thereby to cause rotation of the output gear in one direction, and wherein the one-way clutch includes an inner race, centred on the rocker arm axis, which has a circumferential outer surface, an outer race which has a profiled ramp surface which opposes and which is spaced from the circumferential outer surface, a plurality of ramp rollers which are movably located between the profiled ramp surface and the circumferential outer surface, and biasing components which secure the ramp rollers to the outer race.

10. The machine according to claim 9 wherein the rack member is on a carriage which is constrained to reciprocate linearly and which is movable, to a limited extent, transversely relative to the direction of linear movement of the thrust point.

11. The machine according to claim 10 which includes a bearing arrangement between the carriage and the rotor follower which allows limited rotational movement between the carriage and the rotor follower in at least two transverse directions.

\* \* \* \* \*